United States Patent [19]

Wismer et al.

[11] 4,419,467
[45] Dec. 6, 1983

[54] PROCESS FOR THE PREPARATION OF CATIONIC RESINS, AQUEOUS, DISPERSIONS, THEREOF, AND ELECTRODEPOSITION USING THE AQUEOUS DISPERSIONS

[75] Inventors: Marco Wismer, Gibsonia; Joseph F. Bosso, Lower Burrell, both of Pa.

[73] Assignee: PPG Industries, Inc., Pittsburgh, Pa.

[21] Appl. No.: 301,712

[22] Filed: Sep. 14, 1981

[51] Int. Cl.$^3$ ............................................. C08L 63/02
[52] U.S. Cl. ................................. 523/414; 204/181 C; 523/416; 523/417; 523/420; 523/426; 524/901; 525/510; 525/523; 525/528; 528/110
[58] Field of Search ............... 523/414, 420, 416, 417, 523/426; 524/901; 525/523, 510, 528; 204/181 C; 528/110

[56] References Cited

U.S. PATENT DOCUMENTS 3,839,252 10/1974 Bosso et al. ................. 260/29.2 EP
4,104,147 8/1978 Marchetti et al. ............. 204/181 C
4,148,772 4/1979 Marchetti et al. .................. 523/420
4,260,720 4/1981 Bosso et al. ........................ 528/109
4,297,261 10/1981 Jozwiak, Jr. ....................... 524/901

Primary Examiner—Theodore E. Pertilla
Attorney, Agent, or Firm—William J. Uhl

[57] ABSTRACT

An improved process for the preparation of cationic resins derived from polyepoxides is disclosed. Typically, the process comprises contacting the polyepoxide with particular polyether polyols and heating the two together to form a resin which may then be reacted with a cationic base group former such as an amine and acid. Aqueous dispersions of the cationic resins prepared by the improved process are useful for coating applications, particularly cationic electrodeposition. They exhibit good low temperature cure response and the cured coatings have good physical properties such as resistance to water, detergent and salt spray corrosion.

14 Claims, No Drawings

PROCESS FOR THE PREPARATION OF CATIONIC RESINS, AQUEOUS, DISPERSIONS, THEREOF, AND ELECTRODEPOSITION USING THE AQUEOUS DISPERSIONS

BACKGROUND OF THE INVENTION

Field of the Invention: The present invention relates to a process for preparing cationic resins, to aqueous dispersions of the cationic resins, and to the use of these dispersions in cationic electrodeposition.

Brief Description of the Prior Art: Cationic electrodeposition resins are well known in the art. For example, U.S. Pat. No. 4,104,147 to Jerabek et al discloses cationic electrodepositable resins which are formed from reacting a polyepoxide with a primary or secondary amine and solubilizing the polyepoxide-amine adduct in aqueous medium with the aid of acid. The polyepoxide is contacted and heated with a polymeric polyol, for example, a polyester polyol such as a polycaprolactone diol or a polyether polyol such as polyoxytetramethylene glycol before reaction with the primary or secondary amine.

U.S. Pat. No. 3,839,252 discloses quaternary ammonium salt group-containing resins which are formed from reacting a polyepoxide with a tertiary amine salt. The polyepoxides are optionally contacted and heated with a polyether polyol such as polyoxypropylene glycol or polyoxyethylene glycol before reaction with the tertiary amine salt.

U.S. Pat. No. 4,260,720 discloses cationic electrodepositable resins which are derived from a polymercapto-chain extended polyepoxide. Among the polyepoxides which may be used are polyglycidyl ethers of cyclic polyols such as bisphenol A and 1,2-bis(hydroxymethyl)cyclohexane. These polyepoxides can be produced by etherification of the cyclic polyol with epichlorohydrin in the presence of alkali. Besides bisphenol A and 1,2-bis(hydroxymethyl)cyclohexane, oxyalkylated adducts of these cyclic polyols such as ethylene oxide and propylene oxide adducts can be used.

SUMMARY OF THE INVENTION

The present invention relates to an improved process for preparing a resin which contains cationic base groups comprising reacting a polyepoxide resin with a cationic base group former. The improvement of the invention comprises contacting a polyepoxide with a polyether polyol and heating the two together to form the polyepoxide resin. The polyether polyol is formed from reacting:

(A) a cyclic polyol with
(B) ethylene oxide or a mixture of ethylene oxide and an alkylene oxide having 3 to 8 carbon atoms in the alkylene chain.

The equivalent ratio of (B) to (A) is within the range of 3 to 20:1.

The invention also relates to aqueous dispersions containing the cationic resins prepared by the improved process, to a method of cationic electrodeposition using such aqueous dispersions, and to the coated articles derived therefrom. Cured electrodeposited coatings have better water, detergent and salt spray corrosion resistance, particularly when the coatings are cured at low temperature, than comparable coatings of the prior art.

DETAILED DESCRIPTION

The cationic resins of the present invention are non-gelled reaction products formed from contacting and heating together a polyepoxide with a polyether polyol, described in detail below, followed by reaction with a cationic base group former.

The cationic resins of the invention have high rupture voltages and throwpower and deposit as films with improved flexibility. When compared with cationic products using polyester polyols such as described in U.S. Pat. No. 4,104,147, the products of the invention have improved salt spray corrosion resistance, particularly products which are cured at low temperature (300°–325° F. [149°–163° C.]). When compared with cationic products using polyalkylene ether polyols such as polypropylene glycol, polyoxyethylene glycol and polyoxytetramethylene glycol, as disclosed in U.S. Pat. Nos. 3,839,252 and 4,104,147, the products of the invention show improvement in alkali, water and salt spray corrosion resistance.

The polyepoxides which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1-bis(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis(hydroxymethyl)cyclohexane and hydrogenated bisphenol A.

Examples of other polyepoxides are polyglycidyl ethers of polyhydric alcohols, such as ethylene glycol, diethylene glycol, triethylene glycol, 1,2-propylene glycol, 1,3-propylene glycol, 1,4-butylene glycol, 1,5-pentanediol and the like.

The polyepoxides have molecular weights of at least 200 and preferably within the range of 200 to 2000, and more preferably about 340 to 2000.

The polyether polyol which is contacted and heated with the polyepoxide is formed from reacting a cyclic polyol with ethylene oxide or optionally with a mixture of ethylene oxide and an alkylene oxide having 3 to 4 carbon atoms in the alkylene chain.

The polyether polyol is prepared by techniques known in the art. Typical reaction conditions are as follows: The cyclic polyol is charged to a reactor capable of maintaining pressure. If the cyclic polyol is a liquid or low melting solid, for example, cyclohexanedimethanol, it can be added to the reactor neat. If the cyclic polyol is a solid or a high viscosity liquid, it is preferably dissolved in a suitable solvent. For example, bisphenol A can be dissolved as a 50 percent solution in methyl isobutyl ketone. Resorcinol can be dissolved in water. A catalyst such as a tertiary amine, for example, N,N'-dimethylcyclohexylamine, or an alkali metal hydroxide, for example, sodium hydroxide or potassium hydroxide, is usually added to the reaction mixture in an amount of about 0.5 to 2 percent by weight based on total weight of the reaction mixture. The cyclic polyol is heated to about 180°–220° F. (82°–104° C.) and the reactor pressured with nitrogen to about 40–60 pounds per square inch (psi).

Ethylene oxide also under pressure, usually at about 80–100 psi, is fed into the reactor slowly in an incremental manner with cooling to remove the exothermic heat obtained when the ethylene oxide reacts with the cyclic polyol. Throughout the addition which lasts about 3 to 4 hours, the temperature of the reaction vessel is kept at about 180°–250° F. (82°–121° C.). At the completion of the ethylene oxide addition, the reaction mixture is held for about 1 to 2 hours at about 200°–250° F. (93°–121° C.) to complete the reaction. If solvent was present, it is stripped off and if sodium hydroxide or potassium hydroxide catalyst were used, they can be neutralized with acid, for example, phosphoric acid, and the salt filtered off.

If a mixture of ethylene oxide and higher alkylene oxide is used, the reaction preferably proceeds first with the higher alkylene oxide and then with the ethylene oxide.

Examples of the cyclic polyols which can be used are polyhydric phenols and cycloaliphatic polyols such as those mentioned above in connection with the preparation of the polyepoxides. Also, cyclic polyols such as the aromatic diols, resorcinol, the aryl-alkyl diols such as the various isomeric xylene diols and heterocyclic diols such as 1,4-piperizine diethanol can be used.

As mentioned above, besides ethylene oxide, mixtures of ethylene oxide and an alkylene oxide containing from 3 to 6, preferably 3 to 4 carbon atoms in the alkylene chain can be used. Examples of such alkylene oxides are 1-2-propylene oxide, 1-methyl-1,2-propylene oxide, 1,2-butylene oxide, butadiene monoepoxide, epichlorohydrin, glycidol, cyclohexane oxide and styrene oxide, with 1,2-propylene oxide being preferred.

The cyclic polyol-alkylene oxide condensate is preferably difunctional or trifunctional, that is, it contains an average of 2 to 3 hydroxyl groups per molecule. Higher functional polyethers can be employed, although their use is not preferred because of gelation problems. An example of a higher functionality polyether would be the reaction product of a cyclic polyol such as sucrose with ethylene oxide.

The equivalent ratio of cyclic polyol to alkylene oxide should be within the range of 1:3 to 20, preferably 1:3 to 15. When the ratio is less than 1:3, the resultant coating has insufficient flexibility. When the ratio is greater than 1:20, the electrical resistivity of the film will be adversely affected resulting in lower rupture voltages and throwpower, and the cured films will have poorer salt spray corrosion resistance.

The preferred cyclic polyol-alkylene oxide condensates used in the present invention are believed to have the following structural formula:

R—[(OX)$_m$(OC$_2$H$_4$)$_n$—OH]$_Z$ where R is a cyclic radical, m is equal to 0 to 18, n is equal to 1 to 15, n plus m is equal to 1 to 20, X is an alkylene radical of 3 to 8 carbon atoms and Z is equal to 2 to 3.

The polyepoxide and the polyether polyol can be contacted by simply mixing the two together optionally in the presence of solvent such as aromatic hydrocarbons, for example, toluene, xylene and ketones, for example, methyl ethyl ketone and methyl isobutyl ketone. The polyepoxide and the polyether polyol are heated together, preferably at a temperature of at least 75° C., more preferably at least 90° C. and most preferably about 100° to 180° C., usually in the presence of a catalyst such as 0.05 to 2 percent by weight tertiary amines or quaternary ammonium bases. The time the polyepoxide and polyether polyol are heated together will vary depending on the amounts contacted, how they are contacted, the degree of agitation, temperature, and the presence of catalyst. In general, when the polyepoxide and polyether polyol are contacted in an agitated reactor, they are heated for a time sufficient to increase the epoxy equivalency of the reaction mixture. Preferably, the epoxy equivalency should be increased at least 25, more preferably at least 50, and most preferably from about 75–150 percent over its original value; the epoxide equivalent being determined according to ASTM D-1652 (gram of resin solids containing 1-gram-equivalent of epoxide).

Preferably, the ratio of equivalents of active hydrogen, e.g., hydroxyl, in the polyether polyol to equivalents of 1,2-epoxy in the polyepoxide should be about less than 1, more preferably about 0.1 to about 0.8:1, most preferably 0.3 to 0.6:1.

The polyepoxide and the polyether polyol are contacted and heated together to form a resinous reaction product or resin. Although the nature of the resinous reaction product is not completely understood, it is believed it is a mixture of about 15 to 45 percent by weight of a chain-extended polyepoxide, that is, polyepoxide molecules linked together with polyether polyol molecules and about 55 to 85 percent by weight of unreacted polyether polyol and unreacted polyepoxide or polyepoxide reacted with itself.

The resinous reaction product is then reacted with a cationic group former, for example, an amine and acid. The amine can be a primary, secondary or tertiary amine and mixtures thereof.

The preferred amines are monoamines, particularly hydroxyl-containing amines. Although monoamines are preferred, polyamines such as ethylene diamine, diethylene triamine, triethylene tetraamine, N-(2-aminoethyl)ethanolamine and piperizine can be used but their use in large amounts is not preferred because they are multifunctional and have a greater tendency to gel the reaction mixture than monoamines.

Tertiary and secondary amines are preferred to primary amines because the primary amines are polyfunctional with regard to reaction to epoxy groups and have a greater tendency to gel the reaction mixture. When using polyamines or primary amines, special precautions should be taken to avoid gelation. For example, excess amine can be used and the excess can be vacuum stripped at the completion of the reaction. Also, the polyepoxide resin can be added to the amine to insure that excess amine will be present.

Examples of hydroxyl-containing amines are alkanolamines, dialkanolamines, trialkanolamines, alkylalkanolamines, arylalkanolamines and arylalkylalkanolamines containing from 2 to 18 carbon atoms in the alkanol, alkyl and aryl chains. Specific examples include ethanolamine, N-methyl-ethanolamine, diethanolamine, N-phenylethanolamine, N,N-dimethylethanolamine, N-methyldiethanolamine and triethanolamine.

Amines which do not contain hydroxyl groups such as mono, di and tri-alkyl amines and mixed alkyl-aryl amines and substituted amines in which the substituents are other than hydroxyl and in which the substituents do not detrimentally affect the epoxy-amine reaction can also be used. Specific examples of these amines are ethylamine, propylamine, methylethylamine, diethylamine, N,N-dimethylcyclohexylamine, triethylamine, N-benzyldimethylamine, dimethylcocoamine and dimethyltallowamine. Also, amines such as hydrazine and propylene imine can be used. Ammonia can also be used and is considered for the purposes of this application to be an amine.

Mixtures of the various amines described above can be used. The reaction of the primary and/or secondary amine with the polyepoxide resin takes place upon mixing the amine with the product. The reaction can be conducted neat, or optionally in the presnce of suitable solvent. Reaction may be exothermic and cooling may be desired. However, heating to a moderate temperature, that is, within the range of 50° to 150° C., may be used to hasten the reaction.

The reaction product of the primary or secondary amine with the polyepoxide resin attains its cationic character by at least partial neutralization with acid. Examples of suitable acids include organic and inorganic acids such as formic acid, acetic acid, lactic acid, phosphoric acid and carbonic acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

In the reaction of the tertiary amine with the polyepoxide resin, the tertiary amine can be prereacted with the acid such as those mentioned above to form the amine salt and the salt reacted with the polyepoxide to form the quaternary ammonium salt group-containing resin. The reaction is conducted by mixing the amine salt and the polyepoxide resin together in the presence of water. Typically, the water is employed on the basis of about 1.75 to about 20 percent by weight based on total reaction mixture solids.

Alternately, the tertiary amine can be reacted with the polyepoxide resin in the presence of water to form a quaternary ammonium hydroxide group-containing polymer which, if desired, may be subsequently acidified. The quaternary ammonium hydroxide-containing polymers can also be used without acid, although their use is not preferred.

In forming the quaternary ammonium base group-containing polymers, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary, although a solvent such as a sterically hindered ester, ether or sterically hindered ketone may be used if desired.

In addition to the primary, secondary and tertiary amines disclosed above, a portion of the amine which is reacted with the polyepoxidepolyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents which are described in more detail below.

Besides resins containing amine salts and quaternary ammonium base groups, resins containing other cationic groups can be used in the practice of this invention. Examples of other cationic resins are quaternary phosphonium resins and ternary sulfonium resins as described in U.S. Pat. No. 3,894,922 and U.S. Pat. No. 3,959,106, both to Wismer and Bosso. However, resins containing amine salt groups and quaternary ammonium base groups are preferred and the amine salt group-containing resins are the most preferred.

The extent of cationic group formation of the resin should be selected that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

In general, most of the cationic resins prepared by the process of the invention contain from about 0.1 to 3.0, preferably from about 0.3 to 1.0 milliequivalents of cationic group per gram of resin solids.

As indicated above, cationic resins of the present invention contain active hydrogens such as those derived from hydroxyl, primary and secondary amino which make them reactive at elevated temperatures with a curing agent. The curing agent which is used should be one which is stable in the presence of the cationic resin at room temperature but reactive with the active hydrogens at elevated temperatures, that is, from about 90° to 260° C. to form a crosslinked product. Examples of suitable curing agents are aminoplast resins, capped isocyanates and phenolic resins such as phenol-formaldehyde condensates including allyl ether derivatives thereof.

The preferred curing agents are the capped isocyanates and these are described in U.S. Pat. No. 4,104,147, column 7, line 36, continuing to column 8, line 37, the portions of which are hereby incorporated by reference.

Sufficient capped polyisocyanate is present in the coating system such that the equivalent ratio of latent isocyanate groups to active hydrogens is at least 0.1:1 and preferably about 0.3 to 1:1.

Besides the blocked or capped isocyanates, aminoplast resins can also be employed as curing agents in the practice of the present invention. Suitable aminoplasts for use with the reaction products are described in U.S. Pat. No. 3,937,679 to Bosso and Wismer in column 16, line 3, continuing to column 17, line 47, the portions of which are hereby incorporated by reference. As disclosed in the aforementioned portions of the '679 patent, the aminoplast can be used in combination with methylol phenol ethers. The aminoplast curing agents usually constitute from about 1 to 60 and preferably 5 to 40 percent by weight of the resinous composition based on total weight of aminoplast and the reaction product of a polyepoxide and amine. Also, mixed curing agents such as mixtures of capped isocyanates and aminoplast resins can be used.

The resins of the present invention are nongelled and are employed in the form of aqueous dispersions. The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and in general is not critical. For example, the aqueous dispersion preferably contains at least 0.5 and usually from about 0.5 to 50 percent by weight resin solids. By non-gelled is meant the reaction products are substantially free of crosslinking and have an intrinsic viscosity when dissolved in a suitable solvent. The intrinsic viscosity of the reaction product is an indication of its molecular weight. A gelled reaction product, on the other hand, since it has essentially infinitely high molecular weight, will have an intrinsic viscosity too high to measure.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexnol, isophorone, 4-methoxy-2-pentanone, ethylene and propylene glycol, and the monoethyl, monobutyl and monohexyl ethers of ethylene glycol. The amount of coalescing solvent is not unduly critical and is generally between about 0.01 and 40 percent by weight, preferably about 0.05 to about 25 percent by weight based on total weight of the aqueous medium.

In some instances, a pigment composition and, if desired, various additives such as plasticizers, surfactants or wetting agents are included in the dispersion. The pigment composition may be any of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as pigment-to-resin ratio. In the practice of the invention, the pigment-to-resin ratio is usually within the range of 0.02 to 1:1. The other additives mentioned above are usually in the dispersion in amounts of 0.01 to 10 percent by weight based on total weight of resin solids.

Also, soluble lead such as lead acetate may be added to the dispersion. See, for example, U.S. Pat. No. 4,115,226 to Zwack and Jerabek.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but typically between 50 and 500 volts. The current density is usually between 0.5 ampere and 15 amperes per square foot and tends to decrease during electrodeposition indicating the formation of an insulating film.

The aqueous resinous dispersions of the present invention can also be used in other conventional coating applications such as flow, dip, spray and roll coating applications. For electrodeposition and the other conventional coating applications, the coating compositions can be applied to a variety of electroconductive substrates especially metal such as steel, aluminum, copper, magnesium and the like, but also including metallized plastic and conductive carbon-coated materials. For the other conventional coating applications, the compositions can be applied to the non-metallic substrates such as glass, wood and plastic.

After the coating has been applied by electrocoating or other conventional coating applications, it is cured usually by baking at elevated temperatures such as 90° to 260° C. for about 1 to 30 minutes.

Illustrating the invention are the following examples, which, however, are not to be construed as limiting the invention to their details. All parts and percentages in the examples as well as throughout the specification are by weight unless otherwise indicated.

VEHICLE RESINS

Example A

The following example shows the preparation of a cationic electrodepositable resin which was formed by contacting and heating together a polyglycidyl ether of bisphenol A with a bisphenol A-ethylene oxide adduct (1/10 molar ratio) to form a polyepoxide resin, followed by reacting the resin with a mixture of secondary amines. The amine reaction product is then combined with a blocked isocyanate crosslinking agent, partially neutralized with acid and dispersed in deionized water. The cationic electrodepositable resin was prepared from the following mixture of ingredients:

| Ingredients | Parts by Weight | Solids | Equivalents |
| --- | --- | --- | --- |
| EPON 829[1] | 727.6 | 702.1 | 3.735 |
| Adduct of bisphenol A-ethylene oxide (1/10 molar ratio) | 303.2 | 303.2 | 1.000 |
| Xylene | 37.8 | | |
| Bisphenol A | 197.8 | 197.8 | 1.735 |
| Benzyldimethylamine | 3.6 | | |
| Blocked isocyanate crosslinker[2] | 1016.3 | 711.4 | |
| Diketimine derivative[3] | 73.06 | 53.1 | 0.609 |
| N—methylethanolamine | 65.0 | 65.0 | 0.865 |
| 1-phenoxy-2-propanol | 101.6 | | |

[1]Epoxy resin solution made from reacting epichlorohydrin and bisphenol A having an epoxy equivalent of 188 commercially available from Shell Chemical Company.
[2]Polyurethane crosslinker formed from half-capping toluene diisocyanate (80/20 2,4-/2,6-isomer mixture) with 2-hexoxyethanol and reacting this product with trimethylolpropane in a 3:1 molar ratio. The crosslinker is present as a 70 percent solids solution in methyl isobutyl ketone and butanol (9:1 weight ratio).
[3]Diketimine derived from diethylenetriamine and methyl isobutyl ketone (73 percent solids in methyl isobutyl ketone).

The EPON 829, bisphenol A-ethylene oxide adduct and xylene were charged to a reaction vessel and heated together with nitrogen sparge to 210° C. The reaction was held at 200°-215° C. with refluxing to remove any water present. The ingredients were cooled to 150° C. and the bisphenol A and 1.6 parts of the benzyldimethylamine (catalyst) added. The reaction mixture was heated to 150° C. and held between 150° and 190° C. for about ½ hour and then cooled to 130° C. The remaining portion of the benzyldimethylamine catalyst was added and the reaction mixture held at 130° C. for about 2½ hours until a reduced Gardner-Holdt viscosity (50 percent resin solution in 2-ethoxyethanol) of H was obtained. Note, the reaction sequence is believed to be the EPON 829 reacting first with bisphenol A to form a polyepoxide with an epoxide equivalent of about 600, followed by heating with the bisphenol A-ethylene oxide adduct to an epoxide equivalent of about 990. The polyurethane crosslinker, the diketimine derivative and the N-methylethanolamine were then added and the temperature of the reaction mixture brought to 110° C. and held at this temperature for one hour. The 1-phenoxy-2-propanol was added and then 2200 parts of the reaction mixture was dispersed in a mixture of 30.9 grams acetic acid, 44.3 grams of the surfactant mixture described in Example B, infra, and 2718 grams of deionized water. The solids content of the aqueous dispersion was 35.5 percent. This dispersion was then diluted to 32 percent solids and the solvent removed by vacuum distillation at 85°-90° C. The solids of the solvent stripped dispersion was about 36 percent.

Example B

A cationic electrodepositable resin similar to Example A was prepared with the exception that a bisphenol A-ethylene oxide condensate having a molar ratio of 1/7 was used.

| Ingredients | Parts by Weight |
|---|---|
| EPON 829 | 114.0 |
| Bisphenol A-ethylene oxide adduct (1/7 molar ratio) | 38.0 |
| Xylene | 5.4 |
| Bisphenol A | 31.0 |
| Benzyldimethylamine | 0.6 |
| Crosslinker of Example A | 139.6 |
| Diketimine of Example A | 11.9 |
| N—methylethanolamine | 9.3 |
| 1-phenoxy-2-propanol | 14.7 |
| Acetic Acid | 5.2 |
| Surfactant[1] | 7.2 |
| Deionized water | 408.0 |

[1]Cationic surfactant prepared by blending 120 parts of alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol and 221 parts by weight of deionized water and 19 parts of glacial acetic acid.

The procedure for preparing the resinous composition was as generally described in Example A except that the EPON 829, bisphenol A and bisphenol A-ethylene oxide adduct were heated together to a reduced Gardner-Holdt viscosity of K instead of H. The increase in epoxy equivalent was from about 600 to 950. Ninety-seven and one-half (97½) percent by weight of the resin was dispersed in the mixture of acetic acid, surfactant and deionized water as described in Example A. The organic solvent was removed by vacuum distillation as described in Example A.

Example C

The following example shows the preparation of a cationic electrodepositable resinous composition similar to Example A with the exception that a bisphenol A-propylene oxide-ethylene oxide adduct (1/2/4 molar ratio) was employed.

| Ingredients | Parts by Weight |
|---|---|
| EPON 828[1] | 702.2 |
| Bisphenol A-propylene oxide-ethylene oxide adduct (1/2/4 molar ratio) (OH value = 230) | 243.1 |
| Xylene | 60.2 |
| Bisphenol A | 197.8 |
| Benzyldimethylamine | 3.8 |
| Polyurethane crosslinker of Example A | 991.3 |
| Diketimine derivative of Example A | 72.5 |
| N—methylethanolamine | 65.0 |
| 1-phenoxy-2-propanol | 97.7 |

[1]Epoxy resin solution made from reacting epichlorohydrin and bisphenol A having an epoxy equivalent of about 188, commercially available from Shell Chemical Company.

The procedure for preparing the resinous composition was as generally described in Example A with the exception that the EPON 828, bisphenol A and bisphenol A-propylene oxide-ethylene oxide adduct were heated together to a Gardner-Holdt reduced viscosity of N-O. The increase in epoxy equivalent was from about 570 to 1024. The reaction mixture (2100 parts by weight) was dispersed in 30.6 parts of acetic acid and 42.2 parts of the surfactant mixture of Example B and 2564.6 parts of deionized water. The solvent was removed as described in Example A and the final dispersion had a solids content of 38.1 percent.

Example D

A cationic electrodepositable resinous composition similar to that of Example A was prepared with the exception that a resorcinol-ethylene oxide condensate (1/6.5 molar ratio) was used.

| Ingredients | Parts by Weight |
|---|---|
| EPON 829 | 727.6 |
| Resorcinol-ethylene oxide (1/6.5 molar ratio) (OH value = 305) | 183.9 |
| Xylene | 31.5 |
| Bisphenol A | 197.8 |
| Benzyldimethylamine | 3.6 |
| Polyurethane crosslinker of Example A | 946.8 |
| Diketimine derivative of Example A | 76.0 |
| N—methylethanolamine | 65.0 |
| 1-phenoxy-2-propanol | 93.4 |

The procedure for preparing the resinous composition was as generally described in Example A with the exception that the reaction was held for a reduced Gardner-Holdt viscosity of N. The increase in epoxy equivalent was from about 540 to 901. The reaction mixture (2000 parts) was dispersed in a mixture of 30.5 parts acetic acid, 40.2 parts of the surfactant mixture of Example B and 2459 parts of deionized water. The solvent was removed as described in Example A. The final dispersion had a solids content of 36.9 percent.

Example E

A cationic electrodepositable resinous composition similar to Example A was prepared with the exception that a cyclohexanedimethanolethylene oxide adduct (1/6.5 molar ratio) was used.

| Ingredients | Parts by Weight |
|---|---|
| EPON 828 | 702.2 |
| Cyclohexanedimethanol-ethylene oxide adduct (1/6.5 molar ratio) | 183.9 |
| Xylene | 57.0 |
| Bisphenol A | 197.8 |

-continued

| ingredients | Parts by Weight |
|---|---|
| Benzyldimethylamine | 3.6 |
| Polyurethane crosslinker of Example A | 945.4 |
| Diketimine derivative of Example A | 73.6 |
| N—methylethanolamine | 65.0 |
| 1-phenoxy-2-propanol | 93.2 |

The procedure for preparing the resinous composition was as generally described in Example A with the exception that the reaction was held for an R Gardner-Holdt reduced viscosity. The increase in epoxy equivalent was from about 540 to 949. The reaction mixture (2000 parts) was dispersed in a mixture of 30.5 parts acetic acid, 40.2 parts of the surfactant mixture of Example B and 2460 parts of deionized water. Th solvent was removed as described in Example A and the final dispersion had a solids content of 36.9 percent.

Example F

A cationic (quaternary ammonium salt group) electrodepositable resinous composition was prepared by contacting and heating together a polyepoxide and a bisphenol A-ethylene oxide adduct (1/10 molar ratio), combining the product with a blocked isocyanate crosslinker, reacting with a tertiary amine acid salt and dispersing the reaction product in water.

| Ingredients | Solids | Equivalents | Parts by Weight |
|---|---|---|---|
| EPON 829 | 541.4 | 2.85 | 561.1 |
| Bisphenol A | 176.6 | 1.54 | 176.6 |
| Xylene | | | 4.9 |
| TEXANOL[1] | | | 53.7 |
| Bisphenol A-ethylene oxide adduct (1/10 molar ratio) | 182.0 | 0.60 | 182.0 |
| Benzyldimethylamine | 2.0 | | 2.0 |
| TEXANOL | | | 26.7 |
| Lactic acid | 3.3 | | 3.8 |
| INDOPOL L-14[2] | 31.8 | | 31.8 |
| 2-phenoxyethanol | | | 166.5 |
| Polyurethane crosslinker[3] | 353.7 | | 525.6 |
| Lactic acid salt of dimethylethanolamine[4] | 33.5 | 0.168 | 44.7 |
| Lactic acid salt of dimethylcyclohexylamine[5] | 75.5 | 0.335 | 100.6 |
| GEIGY AMINE C | 7.5 | 0.027 | 7.5 |
| Deionized water | | | 70.0 |

[1]2,2,4-trimethylpentane-1,3-diol monoisobutyrate commercially available from Eastman Chemical Company.
[2]Polybutene commercially available from Amoco Chemical Corp.
[3]2-butoxyethanol fully blocked polymethylene polyphenyl isocyanate as a 68 percent solids solution in 2-butoxyethanol.
[4]75 percent solids solution in isopropyl alcohol.
[5]75 percent solids solution in water.

The EPON 829, bisphenol A and xylene were charged to a reaction vessel and heated under a nitrogen blanket to 150° C. to initiate an exotherm. The reaction mixture was permitted to exotherm for about one hour with the highest temperature reaching 185° C. The reaction mixture was cooled to 169° C. followed by the addition of the bisphenol A-ethylene oxide adduct and the first portion of TEXANOL. The benzyldimethylamine was added and the reaction mixture was held between 126° and 134° C. for about 5 hours until the reaction mixture had a reduced Gardner-Holdt viscosity (50/50 blend in 2-ethoxyethanol) of P-Q. The increase in epoxy equivalent was from about 550 to 1234. At that point, the second portion of TEXANOL, the lactic acid, the INDOPOL L-14, the polyurethane crosslinker, the 2-phenoxyethanol, the dimethylethanolamine and dimethylcyclohexylamine lactate salts, the GEIGY AMINE C and the deionized water were added and the reaction mixture heated to 80° C. and held for 2 hours. The reaction mixture was then thinned with deionized water to a solids content of 32 percent. The resinous dispersion contained 0.389 milliequivalents per gram solids of quaternary ammonium base groups.

Example G

A cationic electrodepositable resin similar to Example F was prepared with the exception that an adduct of bisphenol A-ethylene oxide (1/6 molar ratio) was used.

| Ingredients | Parts by Weight |
|---|---|
| EPON 829 | 561.1 |
| Bisphenol A | 176.6 |
| Xylene | 4.9 |
| TEXANOL | 53.7 |
| Bisphenol A-ethylene oxide adduct (1/6 molar ratio) | 146.6 |
| Benzyldimethylamine | 2.0 |
| TEXANOL | 26.7 |
| Lactic acid | 3.8 |
| INDOPOL L-14 | 31.8 |
| 2-phenoxyethanol | 166.5 |
| Polyurethane crosslinker[1] | 605.4 |
| Dimethylethanolamine lactic acid salt as used in Example F | 52.1 |
| Dimethylcyclohexylamine lactic acid salt as used in Example F | 84.1 |
| GEIGY AMINE C | 7.5 |
| Deionized water | 70.0 |

[1]Polyurethane crosslinker formed from half-capping toluene diisocyanate (80/20 2,4-/2,6-isomer mixture) with 2-ethoxyethanol and reacting this product with trimethylolpropane in a 3:1 molar ratio. The polyurethane crosslinker is present as a 70 percent solids solution in 2-ethoxyethanol.

The procedure for preparing the cationic resinous composition was as generally described in Example F. The increase in epoxy equivalent was from about 550 to 1220. The resinous mixture had a resin solids content of 32 percent and contained 0.348 milliequivalents of quaternary ammonium base group per gram of resin solids.

ADDITIVE

Example H

The following example shows the preparation of a polyepoxidepolyoxyalkylenediamine adduct. The adduct was made as an additive for subsequent addition to a cationic electrodeposition bath to provide better appearance in the cured coating.

In preparing the adduct, a polyepoxide intermediate was first prepared from condensing EPON 829 and bisphenol A as follows:

| Ingredients | Parts by Weight |
|---|---|
| EPON 829 | 136.1 |
| Bisphenol A | 39.6 |
| 2-butoxyethanol | 52.3 |

The EPON 829 and bisphenol A were charged to a reaction vessel under a nitrogen blanket and heated to 70° C. to initiate an exotherm. The reaction mixture was allowed to exotherm and held at 180° C. for ½ hour. The reaction mixture was cooled to 160° C. and the 2-butoxyethanol added to give a solids content of 75 percent and an epoxy equivalent of 438 (based on solids).

A polyoxypropylenediamine having a molecular weight of 2000 and commercially available from Jefferson Chemical Company as JEFFAMINE D-2000 was reacted with the polyepoxide intermediate described above as follows:

| Ingredients | Parts by Weight |
| --- | --- |
| JEFFAMINE D-2000 | 132.7 |
| Polyepoxide intermediate | 67.4 |
| 2-butoxyethanol | 2.4 |
| Polyurethane crosslinker[1] | 174.5 |
| Acetic acid | 3.9 |
| Surfactant of Example B | 7.4 |
| Deionized water | 459.0 |

[1] Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 70 percent solids solution in methyl isobutyl ketone and butanol (9:1 weight ratio).

The JEFFAMINE D-2000 was charged to a reaction vessel under a nitrogen atmosphere and heated to 90° C. The polyepoxide intermediate was added over the period of about ½ hour. At the completion of the addition, the reaction mixture was heated to 130° C., held for 3 hours, followed by the addition of the 2-butoxyethanol and polyurethane crosslinker. The reaction mixture was then solubilized by blending with acetic acid, the surfactant and deionized water. The adduct had a solids content of 35.5 percent.

Example I

The adduct of Example H was combined with epsilon-caprolactam (for improved rheology) as follows:

| Ingredients | Parts by Weight |
| --- | --- |
| Adduct of Example H | 800.0 |
| Epsilon-caprolactam | 140.0 |
| Deionized water | 260.0 |

The caprolactam was heated to 80° C. to melt it and mixed with the adduct. The mixture was then thinned with deionized water.

PAINTS

The following Examples (1–6) show the preparation of paints from the cationic electrodepositable coating vehicles, pigment pastes and additives described above. The paints were made by mixing the ingredients together with low shear agitation. The paints were electrodeposited onto various steel substrates.

The wet films were cured at elevated temperatures, the thickness of the coatings measured and the cured coatings evaluated for water and salt spray corrosion resistance. The results are shown in Table I appearing at the end of Example 6.

Example 1

A cationic electrodepositable paint was prepared from the cationic resin of Example A. The resin was combined with a tin catalyst, pigmented with clay, basic lead silicate, carbon black, and strontium chromate, and thinned with deionized water.

The paint in the form of an electrodeposition bath had a solids content of 20 percent, a pigment-to-vehicle ratio of 0.2/1.0, a pH of 6.6 and a rupture voltage of 320 volts at ambient temperature.

Zinc phosphate pretreated and untreated steel panels were cathodically electrodeposited in the bath at 78° F. (26° C.) for 2 minutes at 200 volts.

Example 2

A cationic electrodepositable paint was prepared by blending 1430 grams of the cationic resin of Example A and 261 grams of the additive of Example I. The blend was combined with a tin catalyst, pigmented with clay, titanium dioxide, basic lead silicate and carbon black, and thinned with deionized water.

The paint in the form of an electrodeposition bath had a solids content of 20 percent, a pigment-to-binder ratio of 0.2/1.0 and a pH of 6.65. Zinc phosphate pretreated and untreated steel panels were cathodically electrodeposited in the bath at 250 volts (zinc phosphate) and 275 volts (untreated steel) for 2 minutes at a bath temperature of 78° F. (26° C.).

Example 3

A cationic electrodepositable paint was prepared by blending 1575 grams of the cationic resin of Example B and 174 grams of the additive of Example H. The blend was combined with a tin catalyst, pigmented with clay, titanium dioxide, basic lead silicate and carbon black, and thinned with deionized water.

The paint in the form of an electrodeposition bath had a resin solids content of 20 percent, a pigment-to-binder ratio of 0.2/1.0.

Zinc phosphate pretreated and untreated steel panels were cathodically electrodeposited in the bath at 225 volts for the zinc phosphate and 175 volts for the untreated steel for 2 minutes at a bath temperature of 78° F. (26° C.).

Example 4

A cationic electrodepositable paint was prepared by blending 1437 grams of the cationic resin of Example C and 174 grams of the additive of Example H. The blend was combined with a tin catalyst, pigmented with clay, titanium dioxide, basic lead silicate and carbon black, and thinned with deionized water.

The paint in the form of a cationic electrodeposition bath had a resin solids content of 20 percent, a pigment-to-binder ratio of 0.2/1.0, a pH of 6.5 and a rupture voltage of 355 volts of 26° C. The resin also had a GM throwpower of 11¼ inches measured at 300 volts at 26° C. Zinc phosphate pretreated and untreated steel panels were cathodically electrodeposited in the bath at 250 volts at 26° C. for 2 minutes.

Example 5

A cationic electrodepositable paint was prepared by blending 1482 grams of the cationic resin of Example D and 174 grams of the additive of Example H. The blend was combined with a tin catalyst, pigmented with caly, titanium dioxide, basic lead silicate and carbon black, and thinned with deionized water.

The paint in the form of a cationic electrodeposition bath had a solids content of 20 percent, a pigment-to-binder ratio of 0.2/1.0, a pH of 6.5 and a rupture voltage of 350 volts at 26° C. Zinc phosphate pretreated and untreated steel panels were cathodically electrodeposited in the bath at 275 volts for 2 minutes at a bath temperature of 26° C.

Example 6

A cationic electrodepositable paint was prepared by blending 1482 grams of the cationic resin of Example E and 174 grams of the additive of Example H. The blend was combined with a tin catalyst, pigmented with clay, titanium dioxide, basic lead silicate and carbon black, and thinned with deionized water.

The paint in the form of a cationic electrodeposition bath had a solids content of 20 percent, a pigment-to-binder ratio of 0.2/1.0. Zinc phosphate pretreated and untreated steel panels were cathodically electrodeposited in the bath at 300 volts for 2 minutes at a bath temperature of 26° C.

pigmented with carbon black, aluminum silicate and titanium dioxide, and thinned with deionized water.

The paint in the form of an electrodeposition bath had a pigment-to-binder ratio of 0.4/1.0 and contained 15 percent by weight solids.

Zinc phosphate pretreated steel panels were cathodically electrodeposited in the bath at 250 volts for 1½ minutes at a bath temperature of 80° F. (27° C.). The wet films were cured at 400° F. (204° C.) and subjected to detergent resistance testing as described above. After 528 hours, the coatings retained good appearance.

We claim:

1. In a process for preparing a resin which contains cationic base groups comprising reacting a polyepoxide

TABLE 1

Curing Schedules and Evaluation of Cured Coatings of Examples 1-6 for Salt Spray Corrosion Resistance[1] and Water Resistance[2]

| Example | Cure Temperature °F. | (°C.) | Time (min.) | Substrate | Scribe Creepage[1] (inches) | Water Soak[2] Top Coat[3] | Primer |
|---|---|---|---|---|---|---|---|
| 1 | 325 | (163) | 20 | zinc phosphate pretreated | 1/32 | — | — |
|   | "   | "     | "  | untreated steel | 1/32 | — | — |
| 2 | 325 | (163) | 20 | zinc phosphate pretreated | <1/32 | 9 | 10 |
|   | "   | "     | "  | untreated steel | <1/32 | — | — |
| 3 | 300 | (149) | 20 | zinc phosphate pretreated | <1/32 | 6 | 10 |
|   | "   | "     | "  | untreated steel | 3/64 | 4 | 8 |
| 3 | 325 | (163) | 20 | zinc phosphate pretreated | <1/32 | 8 | 10 |
|   | "   | "     | "  | untreated steel | 1/32 | 8 | 9 |
| 3 | 350 | (177) | 20 | zinc phosphate pretreated | <1/32 | 4[a] | 10 |
|   | "   | "     | "  | untreated steel | 11/16 | 7 | 9 |
| 4 | 325 | (163) | 20 | zinc phosphate pretreated | <1/32 | 8 | 10 |
|   | "   | "     | "  | untreated steel | <1/32 | — | — |
| 5 | 325 | (163) | 20 | zinc phosphate pretreated | <1/32 | 5 | 10 |
|   | "   | "     | "  | untreated steel | <1/32 | — | — |
| 6 | 325 | (163) | 20 | zinc phosphate pretreated | <1/32 | 5 | 10 |
|   | "   | "     | "  | untreated steel | 3/32 | — | — |

[1] Coated panels scribed with an "X" and exposed to a salt spray fog as described in ASTM D-117. After 14 days, the panels were removed from the testing and the scribe mark taped with masking tape, the tape pulled off at a 45° angle and the creepage from the scribe line measured. Creepage is the area where the coating has lifted from the panel surface.

[2] Coated panels soaked in water at 120° F. (49° C.) for 24 hours, removing the panel from the water, permitting it to stand at room temperature for 1 hour, followed by crosshatching the coated surface, taping the crosshatch area with masking tape and pulling the masking tape off at a 45° angle. Ratings were assigned a value of 1 to 10 depending on how much coating was removed with the masking tape, with 1 being the worst and 10 the best.

[3] The top coat was deposited from a non-aqueous dispersion acrylic polymer white coating composition available from Cook Paint and Varnish Company as WEA 5111. The coating composition as obtained was reduced with a 50/50 mixture of xylene and an aromatic blend of solvents having a boiling point of 155 to 184 so as to obtain a 17-second viscosity measured with a No. 4 Ford cup.

[a] Intercoat adhesion failure.

Example 7

A cationic electrodepositable paint was prepared by blending 1061.8 grams of the cationic resin of Example F with 386 grams of CYMEL 1156 which is an etherified melamine-formaldehyde commercially available from American Cyanamid Company. The blend was pigmented with carbon black, aluminum silicate and titanium dioxide, and thinned with deionized water.

The paint in the form of an electrodeposition bath had a pigment-to-binder ratio of 0.4/1.0, and contained 15 percent by weight solids. Zinc phosphate pretreated and untreated steel panels were cathodically electrodeposited in the bath at 250 volts at a bath temperature of 65° F. (18° C.). The wet films were baked at 400° F. (204° C.) for 20 minutes. The coated panels were subjected to testing for detergent resistance as provided by ASTM D-2248 and after 1150 hours, the coatings retained good appearance.

Example 8

A cationic electrodepositable paint was prepared from the cationic resin of Example G. The resin was resin with a cationic base group former and dispersing the resulting cationic resin in aqueous medium, the improvement comprising:

contacting a polyepoxide with a polyether polyol and heating the two together to form the polyepoxide resin, said polyether polyol formed from reacting:
(A) a cyclic polyol with
(B) ethylene oxide or a mixture of ethylene oxide and an alkylene oxide having 3 to 8 carbon atoms in the alkylene chain;
the equivalent ratio of (B) to (A) being within the range of 3 to 20:1.

2. The process of claim 1 in which the polyether polyol has the following structural formula:

$$R\text{-}[(OX)_m(OC_2H_4)_n\text{-}OH]_Z$$

where R is a cyclic radical, n equals 1 to 15, m equals 0 to 18, n plus m equals 1 to 20, X is an alkylene chain of 3 to 8 carbon atoms, and Z equals 2 to 3.

3. The process of claim 1 in which the polyepoxide is a polyglycidyl ether of a cyclic diol having a molecular weight in the range of 340 to 2000.

4. The process of claim 3 in which the cyclic diol is bisphenol A.

5. The process of claim 1 in which the cationic salt group former is selected from the class consisting of primary, secondary or tertiary amine salt groups, quaternary ammonium base groups, ternary sulfonium salt groups, and mixtures thereof.

6. The process of claim 1 in which the cyclic polyol is of the structure:

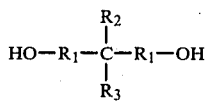

where $R_1$ is a cycloaliphatic or an aromatic radical and $R_2$ and $R_3$ are the same or different and are selected from the class consisting of hydrogen and alkyl containing from 1 to 8 carbon atoms.

7. The process of claim 6 in which $R_1$ is phenyl or hydrogenated phenyl.

8. The process of claim 7 in which $R_2$ and $R_3$ are methyl.

9. An aqueous dispersion containing the cationic resin prepared as described in claims 1, 2, 3, 4, 5, 6, 7, or 8.

10. The aqueous dispersion of claim 9 in which the cationic resin contains active hydrogens and is present with a curing agent which is stable in the presence of the active hydrogens but which is reactive with the active hydrogens at elevated temperature to form a cured product.

11. The aqueous dispersion of claim 10 in which the curing agent is a capped organic polyisocyanate.

12. The aqueous dispersion of claim 11 in which the organic polyisocyanate is fully capped.

13. The aqueous dispersion of claim 10 in which the curing agent is an aminoplast.

14. An aqueous resinous dispersion containing 1 to 50 percent by weight of the cationic resin prepared as described in claims 1, 2, 3, 4, 5, 6, 7, or 8 based on total weight of the aqueous dispersion.

* * * * *